3,368,000
Patented Feb. 6, 1968

3,368,000
FLUOROOXYPHOSPHORANES
Robert Arnold Braun, Newark, Del., assignor to E. I. du Pont de Nemours and Company, Wilmington, Del., a corporation of Delaware
No Drawing. Filed Oct. 30, 1964, Ser. No. 407,895
3 Claims. (Cl. 260—937)

ABSTRACT OF THE DISCLOSURE

Fluorooxyphosphoranes having the structure

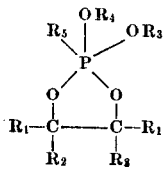

or

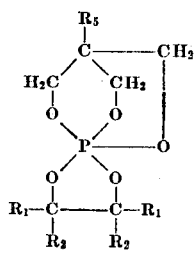

where $R_1$ and $R_2$ are perfluoroalkyl radicals and
$R_3$, $R_4$ and $R_5$ are various alkyl, substituted alkyl, cycloalkyl, phenyl and substituted phenyl radicals.

---

This invention relates to novel fluoro oxyphosphoranes. It is more particularly directed to fluoro oxyphosphoranes having the following structures:

(1)

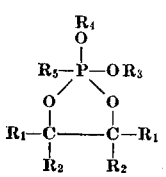

(2)

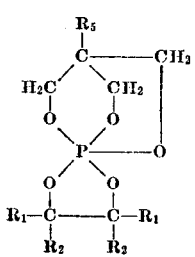

where $R_1$ and $R_2$ can be perfluoroalkyl having 1 through 5 carbon atoms,
$R_3$ and $R_4$ can be alkyl radicals of 1 through 12 carbon atoms; alkyl radicals of 1 through 12 carbon atoms substituted with chlorine, bromine or cyano; cycloalkyl radicals of 5 through 7 carbon atoms; aryl radicals; or aryl radicals substituted with chlorine, bromine, cyano or alkyl of 1 through 5 carbon atoms;

and $R_5$ can be an alkyl radical of 1 through 12 carbon atoms; an alkyl radical of 1 through 12 carbon atoms substituted with chlorine, bromine, or cyano; an O-alkyl radical of 1 through 5 carbon atoms; a cycloalkyl radical of 5 through 7 carbon atoms; an aryl radical; or an aryl radical substituted with chlorine, bromine, cyano or alkyl of 1 through 5 carbon atoms.

In structure (1), the $R_3$ and $R_4$ substituents can be joined by an alkylene bridge having the structure $(CH_2)_{3-7}$, or by such an alkylene bridge substituted with 1–3 alkyl radicals of 1 through 4 carbon atoms.

The compounds of the invention can be prepared by reacting a trivalent organic phosphorous compound with a perfluoro ketone according to the following equations:

(3)

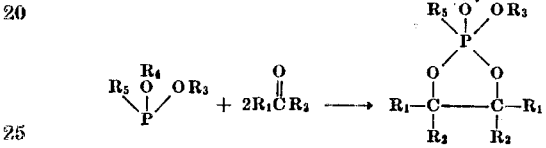

(4)

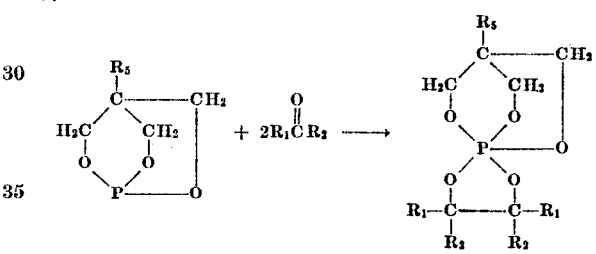

where $R_1$–$R_5$ have the same meaning as in structures (1) and (2).

The compounds of the invention are prepared by bringing stoichiometric proportions of the reactants together in a bomb. The reaction is carried out at autogenous pressure at a temperature of 0–200° C., preferably 50–150° C. This temperature is maintained for from 4 to 24 hours, preferably 8 hours.

The reaction need not be run in an inert medium, but one can use a hydrocarbon medium such as benzene or hexane for better heat distribution in the bomb.

The products of these reactions are colorless crystalline solids which can be purified if desired by recrystallization from hydrocarbon solvents such as petroleum ether or hexane, or by sublimation under reduced pressure. The compounds are, generally speaking, soluble in most organic solvents but insoluble in water.

The compounds of the invention are useful as fire and flame retardants for wood, natural fibers, paper and other combustible substrates. Such materials can be made more resistant to burning by applying a 1–10%, by weight, solution of a compound of the invention in petroleum ether or acetone and then air-drying the material.

Preferred for the superior fire and flame retarding characteristics they confer are the compounds of structures (1) and (2) where $R_1$ and $R_2$ are —$CF_3$. Highly preferred for this use are the compounds of structure (1) where $R_1$ and $R_2$ are —$CF_3$ and $R_3$ and $R_4$ are bridged.

The following examples are submitted so that the invention may be more easily understood and readily practiced. They are intended to illustrate only preferred embodiments of the invention. Those skilled in the art will no doubt compose numerous variations on the central

3 theme, the most probable being the addition of innocuous substituents to the compounds' nuclei. Though these substituents may not be specifically disclosed, it is naturally understood that the resulting compounds are part of the basic concept and are therefore a part of the invention.

Example 1

Phenyl ethylene phosphite (55.2 grams, 0.3 mole) and hexafluoroacetone (100 grams, 0.6 mole) were heated in a bomb at 150° C. for 6 hours.

The resulting liquid product was fractionated to give 105.8 grams of a colorless liquid having a boiling point of 102–105° C. at 0.3 ml. of pressure.

On analysis the product gave the following data:

Calcd. for $C_{14}H_9F_{12}PO_5$: C, 32.57; H, 1.76; F, 44.17; P, 6.00. Found: C, 32.93; H, 2.01; F, 43.87; P, 6.30.

The product had the structure

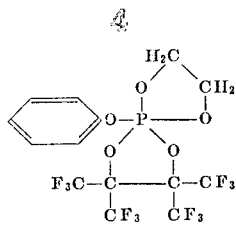

A 5%, by weight, solution of this compound in benzene was prepared. A piece of 1/16-inch hardwood veneer was dipped into this solution and air dried. The wood so treated did not burn, even when exposed to an open flame.

The compounds listed in the following table can be similarly prepared by reacting the corresponding listed phospho reactants, in the listed amounts with hexafluoroacetone:

| Phospho Reactant | Amount, g. | Product |
|---|---|---|
| tri-n-hexyl phosphite $H_{13}C_6O-\overset{OC_6H_{13}}{\underset{}{P}}-OC_6H_{13}$ | 102.0 | (product structure) |
| tri(β-chloroethyl) phosphite $ClCH_2CH_2O-\overset{OCH_2CH_2Cl}{\underset{}{P}}-OCH_2-CH_2Cl$ | 81.0 | (product structure) |
| 4-ethyl-2,6,7-trioxa-1-phosphabicyclo[2.2.2.]octane | 96.8 | (product structure) |
| β-cyanoethyl ethylene phosphite | 48.3 | (product structure) |
| tri cyclohexyl phosphite | 97.5 | (product structure) |
| p-chlorophenyl dimethylene phosphite | 69.6 | (product structure) |

Example 2

Diphenyl phenyl phosphonite (88.2 grams, 0.3 mole) and hexafluoroacetone (100 grams, 0.6 mole) were heated in a stainless steel bomb at 100° C. for 6 hours. The product (170 grams), a clear yellow oil, crystallized completely on cooling and was then purified by recrystallizing from petroleum ether. The resulting colorless crystals had a melting point of 74–76° C.

Analysis of these crystals gave the following data:

Calcd. for $C_{24}H_{15}F_{12}O_4P$: F, 36.40; P, 4.94. Found: F, 36.06; P, 5.01.

This compound had the structure

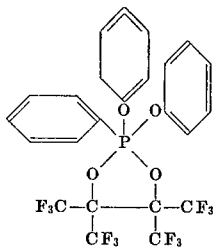

Corresponding compounds of the invention can be similarly prepared by using the perfluoro ketones listed in the following table, in the listed amounts, for hexafluoroacetone:

| Ketone | Amount, g. |
|---|---|
| $C_3F_7\overset{O}{\underset{\|}{C}}-C_3F_7$ Perfluoroheptanone-4 | 220.0 |
| $CF_3\overset{O}{\underset{\|}{C}}-C_4F_9$ Perfluorohexanone-2 | 190.0 |

Example 3

Neopentyl phenyl phosphite (45.2 grams, 0.2 mole) and hexafluoroacetone (67 grams, 0.4 mole) were heated in a stainless steel bomb for 8 hours at 150° C. The resulting white crystalline solid was recrystallized from petroleum ether to give white needles having a melting point of 88–89° C.

These crystals, on analysis, gave the following data:

Calcd. for $C_{17}H_{15}F_{12}O_5P$: C, 36.57; H, 2.71; F, 40.84; P, 5.55. Found: C, 35.92; H, 3.04; F, 41.11; P, 5.48.

This compound had the structure:

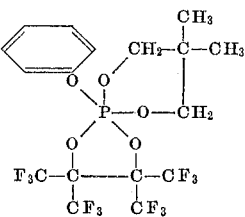

The claims are:

1. A compound selected from the group consisting of compounds having the structures (1)

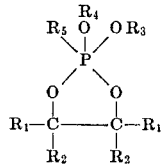

and (2)

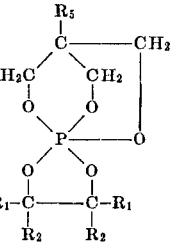

where $R_1$ and $R_2$ are perfluoroalkyl radicals of 1 through 5 carbon atoms;

$R_3$ and $R_4$ are selected from the group consisting of alkyl radicals of 1 through 12 carbon atoms; alkyl radicals of 1 through 12 carbon atoms substituted with radicals selected from the group consisting of chlorine, bromine, cyano and alkyl of 1 through 5 carbon atoms; cycloalkyl of 5 through 7 carbon atoms, phenyl and phenyl substituted with radicals selected from the group consisting of chlorine, bromine, cyano, and alkyl of 1 through 5 carbon atoms, with the proviso that $R_3$ and $R_4$ can be joined by an alkylene bridge selected from the group consisting of $(CH_2)_{3-7}$ and $(CH_2)_{3-7}$ substituted with 1–3 alkyl radicals of 1–4 carbon atoms;

and $R_5$ is selected from the group consisting of alkyl radicals of 1 through 12 carbon atoms; alkyl radicals of 1 through 12 carbon atoms substituted with radicals selected from the group consisting of chlorine, bromine and cyano; O-alkyl radicals of 1 through 5 carbon atoms; cycloalkyl radicals of 5 through 7 carbon atoms, phenyl and phenyl substituted with radicals selected from the group consisting of chlorine, bromine, cyano and alkyl of 1 through 5 carbon atoms.

2. A compound of claim 1 wherein $R_1$ and $R_2$ are $-CF_3$.

3. A compound of claim 1 wherein $R_1$ and $R_2$ are $-CF_3$ and $R_3$ and $R_4$ are bridged.

No references cited.

CHARLES B. PARKER, *Primary Examiner.*

B. BILLIAN, A. H. SUTTO, *Assistant Examiners.*